United States Patent [19]

Fallon et al.

[11] 4,219,040
[45] Aug. 26, 1980

[54] RUPTURE DISC SAFETY VALVE

[75] Inventors: Merton R. Fallon, Northridge; John R. Froehler, Reseda, both of Calif.

[73] Assignee: Draft Systems, Inc., Northridge, Calif.

[21] Appl. No.: 878,070

[22] Filed: Feb. 15, 1978

[51] Int. Cl.³ .................. F16K 17/40; F16K 35/00
[52] U.S. Cl. .................. 137/68 R; 137/209; 220/89 A; 222/396
[58] Field of Search ............ 137/68 R, 69, 70, 71, 137/209; 220/89 A; 222/396

[56] References Cited
U.S. PATENT DOCUMENTS

| 138,171 | 4/1873 | Matthews | 220/89 A |
|---|---|---|---|
| 1,118,649 | 11/1914 | Halter | 137/68 R |
| 1,127,128 | 2/1915 | Walter | 220/89 A |
| 1,648,575 | 11/1927 | Campbell | 137/212 X |
| 2,418,817 | 4/1947 | Cantlin | 137/68 R X |
| 3,648,893 | 3/1972 | Whiting | 137/68 R X |

Primary Examiner—Martin P. Schwadron
Assistant Examiner—Richard Gerard
Attorney, Agent, or Firm—LeBlanc, Nolan, Shur & Nies

[57] ABSTRACT

A safety valve for use with a beverage dispensing system having a pressurized source connected through a conduit to a container of beverage. The safety valve includes a housing having an inlet for connecting said valve to the pressure source and an outlet for connecting the valve to the beverage container through the conduit. A chamber in the housing is divided into at least two subchambers by a rupture disc which ruptures at a predetermined pressure in one of the subchambers. The other side of the disc is exposed to a subchamber which is vented to the atmosphere. Where the pressure in the one subchamber reaches the predetermined level, the rupture disc will burst allowing the pressurized gas to flow out through a vented chamber into the atmosphere, thereby preventing the container from being over-pressurized.

9 Claims, 6 Drawing Figures

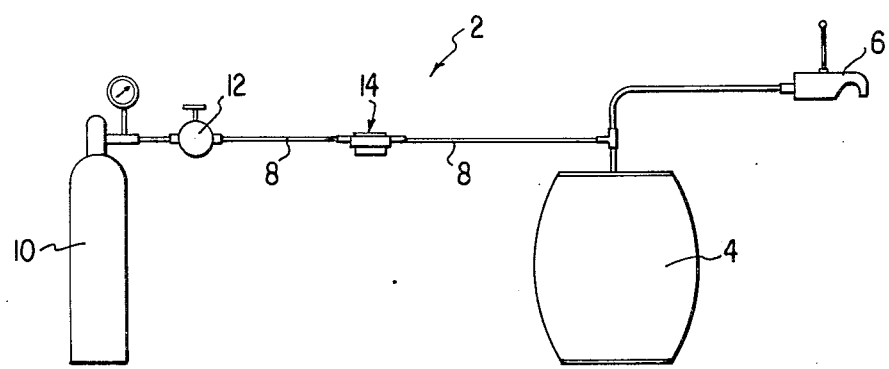
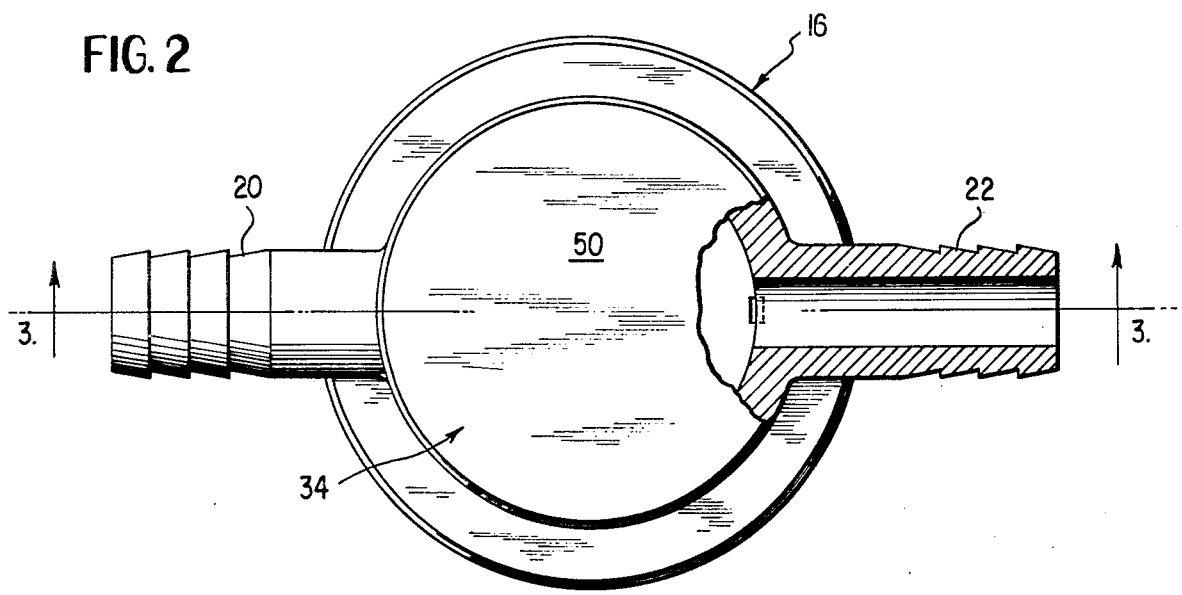
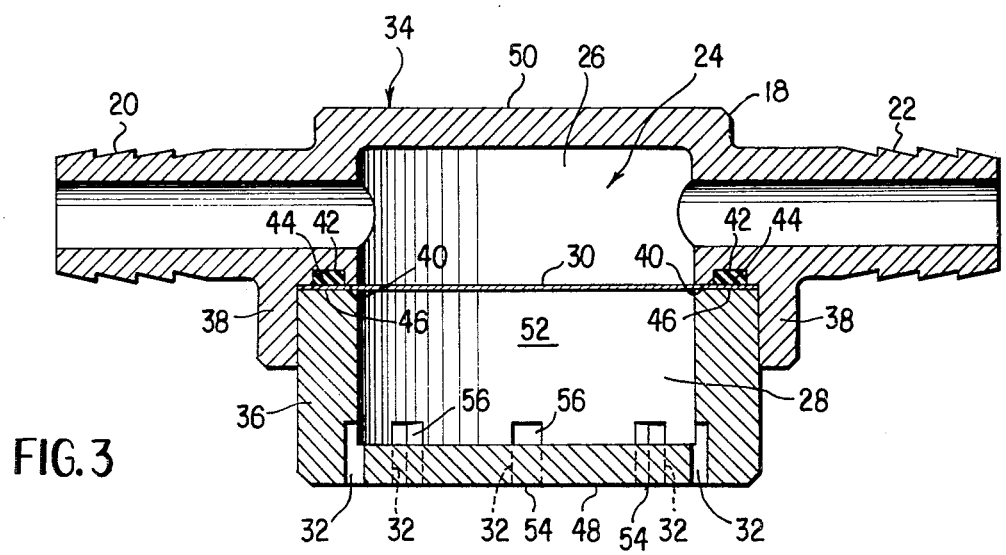

RUPTURE DISC SAFETY VALVE

BACKGROUND OF THE INVENTION

In beverage distribution systems and particularly those used for beer, a pressure source is connected to the keg of beer by a flexible hose through a tapping mechanism which provides a means for securing the hose to the keg and also allowing dispensing of beer from the keg under the pressure provided from the source. Safety devices have been employed in beverage installations of this kind to control the amount of pressure delivered to the keg. Otherwise, should a rupture occur somewhere upstream of the keg tapping mechanism, the keg itself may become overpressurized to such an extent that it could very well explode or at least blow portions of the keg tapping mechanism with such force as to cause catastrophic consequences to those in the area of the keg. Safety devices used for this purpose have typically been mechanically adjustable and employed moving mechanical devices which are subject to frequent failure and blockage.

For adjustable safety devices the most common technique has been the use of a spring bias release valve with various adjusting devices. There have also been attempts to incorporate safety relief valves in the pressure reducing regulator to control pressure delivered from the source. However, these are also adjusted by anyone with the screw driver, pliers or other similar tool. Such adjustments are not unusual when employing such regulators because they allow for the variation of pressure being delivered to the kegs to satisfy the type of beverage and amount of gas which should be incorporated in the beverage as it is dispensed. Unfortunately, the use of these adjustable regulators allow even a well-intentioned operator to adjust the regulator in a manner which cancels the effect of any safety mechanism. For example, where the operator will hear the hissing noise that occurs when gas pressure begins being vented from the safety relief valve, and, knowing that this involves a gas leakage, may adjust the safety relief valve to stop the leakage. In doing so, the relief valve may be bottomed out completely invalidating its existence or use.

Other approaches have included the installation of safety relief valves in the keg or other beverage container itself. This has not proved to be completely satisfactory. By installing the relief valve inside the beverage container, it is continually exposed to the beverage product being dispensed from that container. As these products are by their very nature sticky, they adversely affect the predictability of the valves with which the beverage comes in contact. In other words, as the sticky beverage material permeates the interstices of the valve mechanism, elements of the mechanism may become adhered to one another to such an extent that it will not work properly, if at all.

Another problem with the use of a relief valve inside the beverage container relates to damage which can occur in the normal transportation, loading and unloading of the kegs. As they are dropped into containers, the forces resulting from the impact in this loading and unloading can cause surge pressures which exceed the normal safe limit of the container. This results in actuation of the safety device, allowing the beverage product to spill onto the floor of the truck body, sidewalks, etc., unnecessarily.

With regard to the spring bias relief valve system generally used in the connection apparatus, they are also subject to the major disadvantage of their constant exposure to the beverage itself. As mentioned above, the beverage is sticky and as it dries, it forms a reasonably effective glue which causes the lifting or actuating pressure of the valve itself to vary widely. Because of this variation, the spring bias release system is one which is found to be unreliable and unsafe.

Another major disadvantage is that these safety valves are normally incorporated into some other component element of the dispensing system. They are usually employed with the coupler body of the coupler device which is used to plumb the beverage container to the dispensing hoses and faucets. Because of the limitations in space and costs imposed on these systems, it is necessary that the safety system also be sufficiently small to work within the coupler. As a result of this size limitation, the safety valves may not provide an adequately large orifice through which to expel the excessive gases being applied from an overpressured or malfunctioning gas pressure regulator.

The pressure systems used with beverage distribution systems may require a source of up to over 1000 pounds per square inch. This, of course, varies substantially with temperature, but the normal pressure involved is usually around 800 pounds per square inch. If the reducing regulator on the gas cylinder should fail, allowing full bottle or source pressure to vent itself and to normal gas pressure feedline, it will achieve flow rates of and exceeding 60–100 cubic feet per minute. The size of the expulsion orifice in the existing safety relief valves are so small that they will not achieve the same flow rate at the same source pressure. More importantly, the upper safe limit of the keg pressure, which is much lower than the source pressure, will achieve a limited flow rate of only 17–21 standard cubic feet per minute. In other words, if they are not glued shut by the beverage residue and they lift at the proper pressure, they will not provide sufficient flow rate to safely vent the system. Their proper actuation merely delays the explosive rupture of the beverage container some fraction of a second or perhaps two seconds at the most, depending on whether the container is completely filled or partially filled with the beverage at the time of failure.

Other shortcomings involved with the use of a spring biased or adjustable pressure release valve include the restricted cavities which normally characterize such devices. This may cause contamination of the beverage passage itself.

As a matter of industry practice, these devices have always had an external protrusion which can be gripped to open the device against preset spring pressure to test its actuation or to remove whatever restriction may exist in the valve seat. Protruding as they do, these devices can be mechanically and physically blocked from actuation by contact with any other physical object with which it is placed in contact.

Because the beverage containers are placed within coolers and other storage places, the possibility of there being a blockage for the safety valve is one that is not a remote risk. In fact, in some coolers, the six packs of beverage cans or bottles, packages of meat, vegetables, and other products are frequently refrigerated in restaurant environments and placed on or adjacent these valve mechanisms in such a way that they block or prevent their actuation.

It is generally an object of the subject invention to overcome many of the deficiencies which have existed with the prior art devices discussed above. More particularly, it is an object of the invention to arrive at a safety device for use between a pressure source and a pressurized container from which the beverage is dispensed. The safety device described herein is one which, regardless of its installation, will work properly and can readily and easily be replaced after it has functioned.

Another object of the invention is to arrive at a safety device which cannot be disassembled without being destroyed in order to preclude the possibility of a well-intentioned operator to cancel the safety mechanism.

It is another object of the invention to arrive at a safety valve, which, if it malfunctions, malfunctions in a safe direction. That is, it will readily allow pressurized gas to pass through the valve without pressurizing the container carrying the beverage downstream of the valve.

It is another object of the invention to arrive at a safety valve incorporating a rupture disc, where there is a communication between the surface of the rupture disc and the atmosphere. However, such communication is not one which allows access to the rupture disc by operators using or installing the safety device, thereby impeding inadvertent damage of the device.

It is is still another object of the invention described herein to arrive at a safety device employing a rupture disc which does not require separation or parting of the hose of feedline system. In other words, the rupture disc can rupture, depressurizing the system, while a connection is maintained between the source and the beverage container.

It is still a further object of the invention to produce a safety valve which, when actuated, cannot be corrected in any other way except by total replacement. In this way, it is practically impossible to reuse a valve which is already ruptured.

SUMMARY OF THE INVENTION

The invention generally relates to a safety release valve for use in a beverage distribution system for ensuring that the containers of pressurized beverage are not overpressurized. More specifically, the safety release valve is placed in the hose of a line which connects the pressure source to the container for the beverage. The relief valve is one which employs a rupture disc having one side exposed to the gas used in pressurizing the keg and the other side exposed to the atmosphere. The rupture disc is housed in such a way that it is substantially tamper-proof ensuring that the rupture disc will not be inadvertently broken until the pressure on the other side of the disc has reached the level which is unacceptable for the beverage.

More specifically and as will be defined in the preferred embodiment hereinafter, the relief valve includes a housing having an inlet and an outlet for the gas being delivered to the beverage container. The inlet is carried by a nozzle for connecting the device to the pressure source and the outlet is carried by an oppositely extending nozzle for connecting the device to the container. The housing carries a chamber which is further divided into a pressure chamber communicating with the inlet and outlet for the gas and a vented chamber for communicating with the atmosphere. A rupture disc separates these chambers such that one side is subjected to the pressurized gas and the other side exposed to the vented chamber and ultimately the atmosphere. The housing in turn defines vent holes separate from the inlet and outlet for communicating the surrounding atmosphere to the other side of the rupture disc. In addition, upon rupture, the vent holes act as a pathway for the pressurized gas to pass out of the housing instead of continuing downstream through the outlet of the housing to pressurize the beverage container. The vent holes are characterized by a tortuous path through the housing to the vented chamber for substantially impeding access to the rupture disc whereby tampering with the rupture disc is substantially prevented.

BRIEF DESCRIPTION OF THE DRAWINGS

FIG. 1 shows a schematic of a beverage distribution system employing a safety valve between a source and a beverage container.

FIG. 2 shows a top view of the safety valve with a portion cut away.

FIG. 3 is a cross-section of the safety valve shown in FIG. 2 taken along lines 3—3.

DETAILED DESCRIPTION OF THE EMBODIMENT

Figure 4:
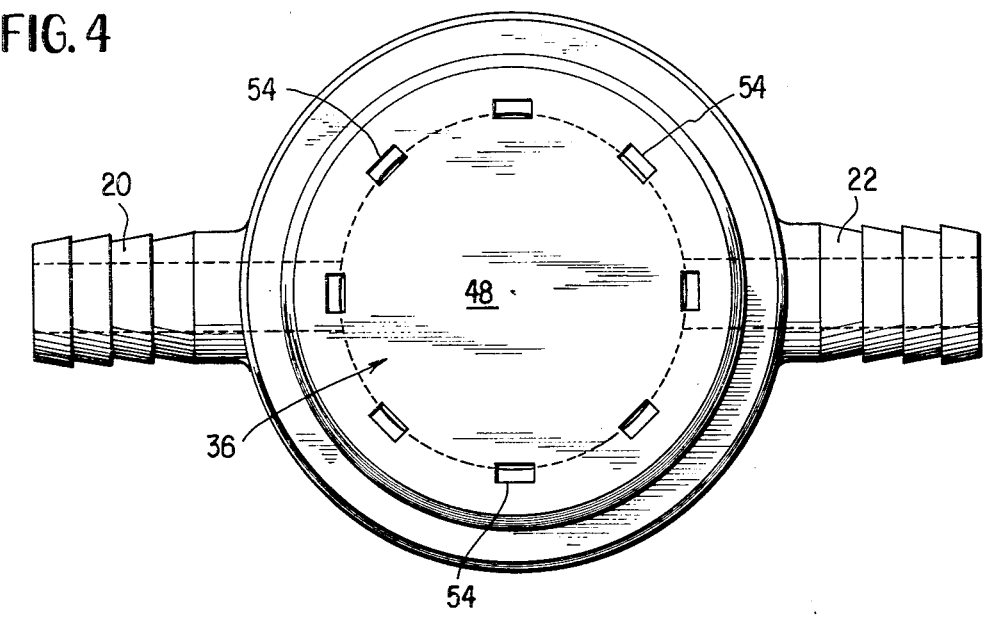
FIG. 4 is a bottom view of the safety valve shown in FIG. 2.

Referring to FIG. 1, there is shown a system 2 for a distribution of beverage from a container or keg 4. A dispenser or a faucet 6 is coupled to the container 4 through a coupler mechanism and exposed typically behind a bar or other facility in a retail establishment where glasses and pitchers can be readily filled. A flexible hose or line 8 is connected through the coupler mechanism and the container 4 to a pressurized bottle or cylinder 10 for maintaining pressure within the container at a predetermined level. Just downstream of the pressure cylinder 10, a pressure regulator 12 is usually incorporated in the line 8 for maintaining this desired pressure. In the line 8 intermediate, the regulator 12 and the container 4, the pressure relief valve 14 of the invention described herein is incorporated to insure that the container 4 is not overpressurized upon failure of the regulator 12 or some other portion of the system.

Reference should now be made to FIGS. 2, 3, and 4 and describing the details of a relief valve for use in the system described above.

The valve 16 is characterized by a housing 18 which is generally cylindrical in configuration having an inlet nozzle 20 and an outlet nozzle 22 extending radially outwardly from the housing along a common axis in opposite directions. Within the housing 18, there is a chamber 24 which is divided into two subchambers by a rupture disc 30. As best seen in FIG. 3, the rupture disc 30 divides the chamber 24 into a pressure chamber 26 which communicates with the pressurized air flowing from the inlet nozzle 20 to the nozzle 22 and a vented chamber 28 which communicates with the atmospheric air surrounding the relief valve 16. Vent ports 32 are provided in the housing 18 for communicating the vented chamber 28 with the surrounding atmosphere.

With the above-described configuration, the relief valve 16 can be placed in the line 8 and function properly regardless of orientation. In other words, the inlet nozzle 20 can function as the outlet nozzle 22 and vice versa without affecting the operation of the rupture disc 30. Similarly, the orientation of the vent ports will not affect the safety feature of the valve. They can be located in any desired position relative to the axis defined by the nozzles 20 and 22. Consequently, an operator, when placing the safety valve in place, does not have to worry about hooking up the proper lines or orientating the valve in the appropriate position.

The burst or rupture disc 30 is a sheet metal plate designed to break or burst under predetermined pressure. When the pressure chamber 26 reaches this predetermined level, the disc 30 will burst allowing the gas in the pressure chamber 26 to flow into vent chamber 28 and through the vent ports 32. This avoids the flow of overpressurized gas downstream to overpressurize the kegs. By using a burst disc 30 in this manner, there are no other adjustments or other mechanisms which could fail if not adjusted properly. In addition, once the disc 30 has burst, its inadvertent reconnection in the line 8 will not deleteriously affect the system. In other words, the kegs will simply not be pressurized to desired level, as there will be constant escape through the vent ports 32 of pressurizing gas.

The housing 18 is further characterized by two portions joined together to secure the rupture disc 30 securely in place. A base 34 carries the nozzles 20 and 22, and a cap 36 is provided with the vent port 32. The base 34 includes an annular ring 38 completely circumscribing the base portion and defining an offset surface 40 which, in turn, defines a recess 42 for receiving 0 ring 44. The cap 36 defines a complementary bottom surface 46 for engaging the rupture disc 30 from the opposite side from which it is engaged by the offset surface 40. In this position, the base 34 and cap 36 are sealed to one another preventing leakage across the rupture disc 30 except by bursting the disc 30 at the predetermined pressure level.

The base 34 includes a solid bottom plate 50 and the cap 36 defines a similar face plate 48 through which the vent ports 32 are made. The vent ports 32 have generally a rectangular cross-section and extend entirely through the face plate 48, each at a position adjacent the intersection of the plate 48 and the inner side walls 52 of the cap 36. As can be seen in FIG. 3, each vent port 32 is actually formed into a portion of the side walls 52. The vent ports 32 include an exposed opening 54 on the exterior portion of the face plate 48 and an interior opening 56 on the internal side of the face plate 48.

Because of the way that these vent ports 32 are formed in the side walls 52, the exposed opening 54 has an axis at right angles to the interior opening 56. As a result, a rather tortuous path is created through the face plate 48 for the flow of gas into and out of the vented chamber 28. As a result, any operator attempting to damage the rupture disc 30 is confronted with a series of vent ports 32 which make this almost impossible. Any device of an effective cross-sectional area which can pass through the vent ports 32 will not be of sufficient strength to puncture the rupture disc 30. But even if such damage would occur, the failure would be in a safe mode since pressurized gas passing through the pressure chamber 26 would simply flow out of that chamber into the vented chamber 28 and out into the surrounding atmosphere. The device always fails in a safe position unlike devices which have typified the prior art which could fail in an unsafe position creating a hazardous condition for personnel and property in the vicinity.

Figure 5:
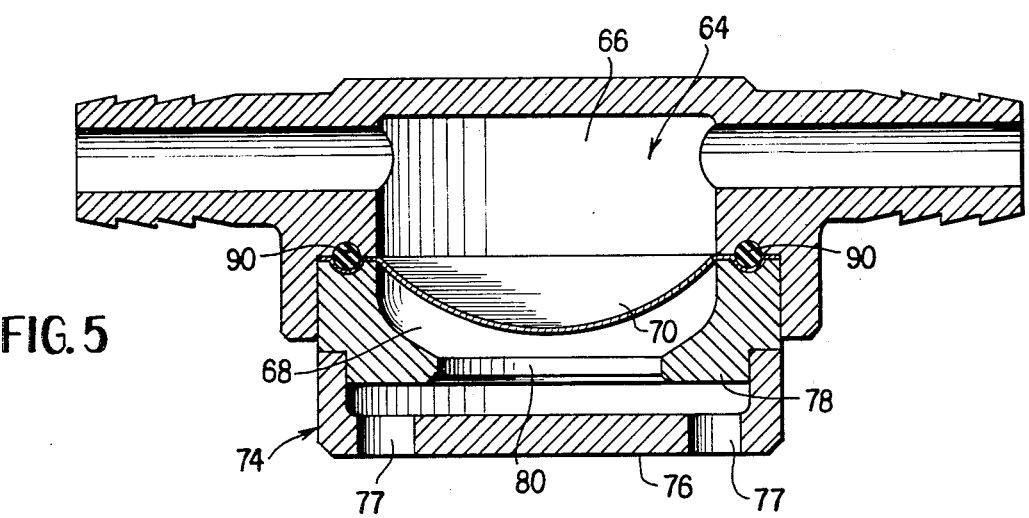
FIG. 5 is a bottom view of another embodiment of the safety valve.
Figure 6:
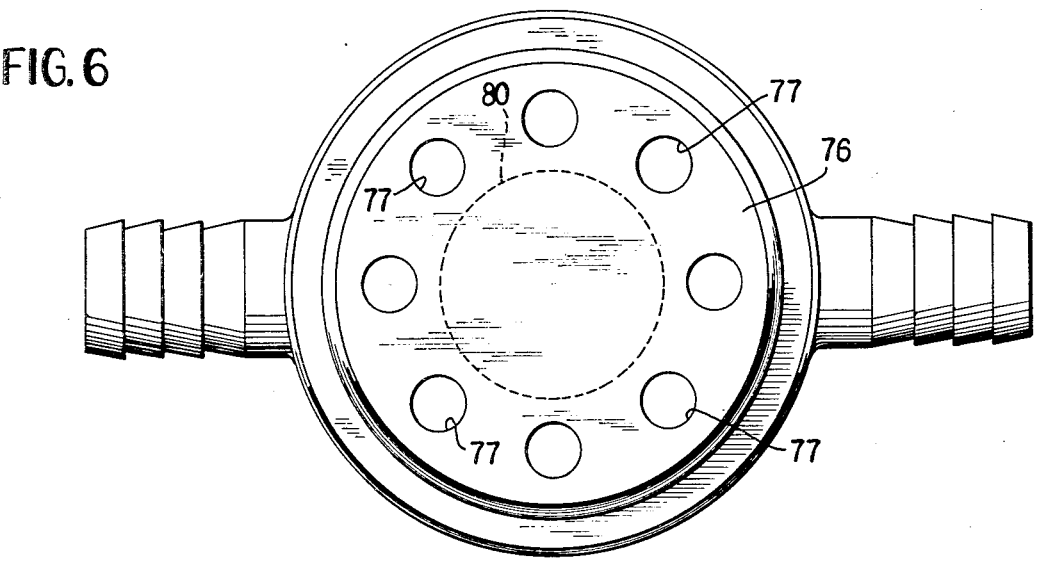
FIG. 6 is a cross-section of the safety valve shown in FIG. 5 taken along lines 6—6.

Another embodiment of the relief valve is shown in FIGS. 5 and 6. The major difference between this embodiment and the one described above is the manner in which the vent ports are placed in the face plate. In this second embodiment, a chamber 64 is divided into a pressure chamber 66 and a vented chamber 68 in a manner somewhat similar to that described above. However, the rupture disc 70 in this embodiment includes a curved configuration with its periphery having a shaped annular surface to correspond to that of the O-ring 90 used in sealing the rupture disc 70 between the two portions of the valve. Intermediate the rupture disc 70 and face plate 76 is a second plate 78 having a circular opening 80 entirely therethrough. The face plate 76 includes circular vent ports 77 about the periphery thereof adjacent to side walls of the cap 74 as best seen in FIG. 6. The peripheral portion of the second plate 78 defining the circular opening 80 is located downstream and across the axis of the vent ports 77 displaced from the bottom surface of the face plate as can be best seen in FIG. 5. In this way, no direct path exists between the vent ports and the circular opening 80. Rather, a tortuous path is effected for preventing the insertion of tools or other instruments through the vent ports 77 to possibly damage the rupture disc 70.

In both of the embodiments discussed above, the tortuous path created by the manner in which the vent ports are located in the housing, also prevents material which is torn away from the rupture disc when ruptured from readily blowing out of the housing and damaging the people or property in the vicinity. In addition, the size and number of vent ports used is related to the opening of the outlet passage in the nozzle such that they will support the flow rate from the bottle to ensure that the keg is not overpressurized. In addition, the plurality of tortuous paths precludes the possibility of ruptured disc material lodging in and blocking all the vent ports 77.

The invention may be embodied in other specific forms without departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patents is:

1. A safety valve for use with a beverage dispensing system having a pressurized source connected through a conduit to a container of beverage comprising:
   (a) a housing with an inlet for connecting said valve to the pressure source and an outlet for connecting the valve to the beverage container;
   (b) said housing having a chamber divided into at least two subchambers including a pressure chamber and a vented chamber;
   (c) a rupture disc separating said pressure chamber from said vented chamber, said rupture disc having one side exposed to said pressure chamber and the other side exposed to said vented chamber, said rupture disc being in sealing relationship with said housing to separate said chambers;
   (d) said housing further defining vent ports separate from said inlet and outlet to vent said vented chamber to surrounding atmosphere, said vent ports including a plurality of vent apertures located about the perimeter of said housing;
   (e) said housing further including a second plate intermediate said rupture disc and said vent aperture, said second plate having an opening therethrough with the periphery of said second plate defining said opening being located in the path of said vent ports so that a tortuous path is formed between said rupture disc and said vent ports, and each of said vent ports defining an axial path parallel to the axis of said valve and concentric with the axis of said opening;
and;
(f) said rupture disc being rupturable under a predetermined pressure level in said pressure chamber to prevent said beverage container from being overpressurized and said inlet and outlet communicating with said pressure chamber in a manner which allows said valve to be connected to the conduit connecting the pressure source and the container of beverage regardless of orientation of said valve whereby the operator can reverse inlets and outlets without affecting the operability of said valve.

2. The safety valve according to claim 1 wherein said vent ports are configured and located relative to said disc to impede insertion of sufficiently rigid member to puncture said disc whereby damage to said disc is substantially prevented other than by rupturing under said predetermined pressure.

3. The valve according to claim 1 wherein said opening further defines an axial path parallel to that of each of said apertures, and said peripheral portion of said second plate being displaced from each of said vent ports to define a path between said vent ports and said opening in a radial direction.

4. A safety valve for use with a beverage dispensing system having a pressurized source connected through a conduit to a container of beverage comprising:
(a) a cylindrical housing having parallel side walls with one end of said housing carrying a face plate and the other end of said housing carrying a bottom plate;
(b) said housing having a chamber between said face and said bottom plate, said chamber being divided into two subchambers including a pressure chamber and a vented chamber by a rupture disc;
(c) said rupture disc having one surface thereof exposed to said pressure chamber and the other surface thereof exposed to said vented chamber, and said rupture disc being in sealing relationship with said housing to separate said chambers;
(d) said face plate having a plurality of vent ports about the periphery thereof and extending entirely through said face plate to communicate said vented chamber with the surrounding atmosphere;
(e) said housing further including a second plate intermediate said rupture disc and said vent ports, said second plate having an opening therethrough with the periphery of said second plate defining said opening being located in the path of said vent ports so that a tortuous path is formed between said rupture disc and said vent ports and each of said vent ports defining an axial path parallel to the axis of said valve and concentric with the axis of said opening;
and;
(f) an inlet and an outlet communicating with said pressure chamber in a manner which allows said valve to be connected to the conduit connecting the pressure source and the container of beverage regardless of orientation of said valve whereby an operator can reverse inlets and outlets without affecting the operability of said valve and said rupture disc being rupturable under a predetermined pressure level allowing gas from said pressure chamber to flow into said vented chamber and out of said vent ports to surrounding atmosphere thereby preventing said beverage container from being overpressurized.

5. The valve according to claim 4 wherein said vent ports are configured and located relative to said disc to impede insertion of a sufficiently rigid member to puncture said disc whereby damage to said disc is substantially prevented other than rupture under said predetermined pressure.

6. The valve according to claim 5 wherein said inlet and outlet for connecting said valve include a male adaptor with concentric annular tong members for securing said valve within said conduit connecting the pressure source with the beverage container.

7. The valve according to claim 6 wherein said male adaptors extend in opposite directions coaxially from said housing.

8. A system for dispensing beverage under pressure comprising:
(a) a container for the beverage with a coupler system extending therefrom having means for attaching a dispenser for dispensing a beverage under pressure and a means for attaching a conduit to connect said container to a pressure source;
(b) a pressure source for pressurizing said container and having means for securing a conduit thereto for delivery of pressurized gas from said source to said container;
(c) a safety valve having an inlet for connecting said valve to a portion of the conduit extending from said pressure source and an outlet for connecting said valve to a portion of the conduit connected to said beverage container, said safety valve further including a housing having a chamber divided into at least two subchambers including a pressure chamber and a vented chamber, said housing including vent ports separate from said inlet and outlet to vent said vented chamber to surrounding atmosphere, and said inlet and outlet communicating with said pressure chamber in a manner which allows said valve to be connected to the conduit connecting the pressure source and the container of beverage regardless of orientation of said valve;
(d) said valve including a rupture disc capable of rupturing at a predetermined pressure level whereby said disc will burst upon the pressure from said pressure source exceeding said predetermined level to prevent said container from being overpressurized, said rupture disc separating said pressure chamber from said vented chamber and said rupture disc having one side exposed to said pressure chamber and the other side exposed to said vented chamber, said rupture disc being in sealing relationship with said housing to separate said chambers; and
(e) said vent ports are configured and located relative to said rupture disc to impede insertion of a sufficiently rigid member to puncture said rupture disc whereby damage to said rupture disc is substantially prevented other than by rupture under the predetermined pressure.

9. The valve according to claim 8 wherein said vent ports include a plurality of vent apertures located about the perimeter of said housing.

* * * * *